UNITED STATES PATENT OFFICE.

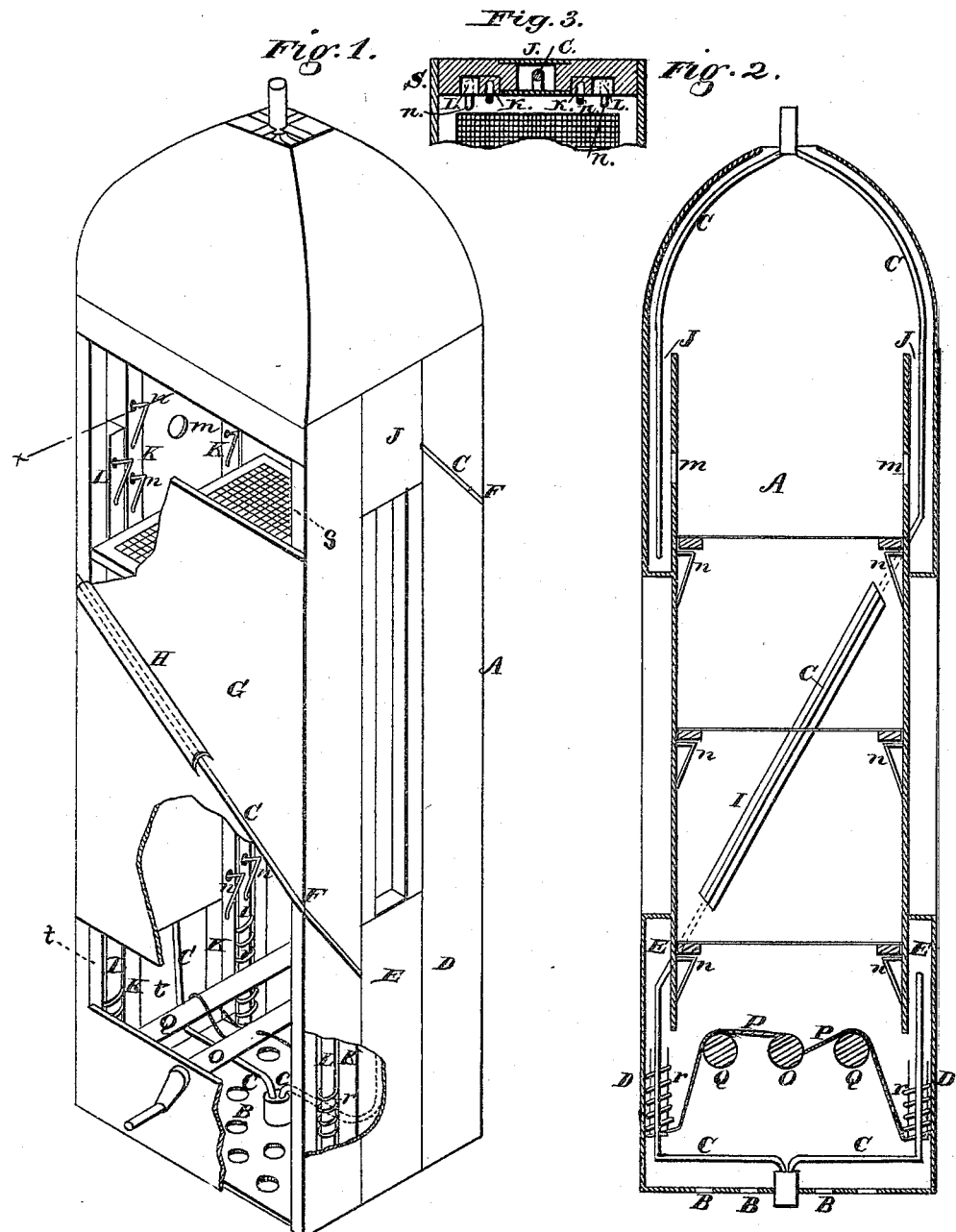

JOHN W. CASSIDY, OF PETALUMA, CALIFORNIA.

IMPROVEMENT IN DRYING APPARATUS.

Specification forming part of Letters Patent No. 172,608, dated January 25, 1876; application filed March 8, 1875.

*To all whom it may concern:*

Be it known that I, JOHN W. CASSIDY, of Petaluma, Sonoma county, State of California, have invented a Drying Apparatus; and I do hereby declare the following description and accompanying drawings are sufficient to enable any person skilled in the art or science to which it most nearly appertains, to make and use my said invention without further invention or experiment.

My invention relates to an improved device for desiccating fruit and other substances by means of artificial heat; and it consists, first, in a novel method of utilizing the heat which passes through the flues from the furnace, and by leading these flues around the chamber within suitable pipes or cases, and making certain openings from these cases into the chamber, I am enabled to admit heated air from any or all sides, and at different heights between the layers of fruit, while heat is also admitted from the bottom of the chamber, or not, as may be desired.

My invention also consists in a novel means of moving the fruit within the chamber, from the time it is admitted until it is again removed.

Referring to the accompanying drawings for a more complete explanation of my invention, Figure 1 is a perspective view of my invention, with a portion of the chamber broken away. Fig. 2 is a vertical section in elevation.

A is the chamber of a drier, and it is made of considerable height, so that the fruit can be admitted from below and moved upward to the place of removal from the chamber. The furnace or heater is placed below the chamber, and the heated air is admitted through openings made in the bottom of the chamber, as shown at B, if desired, but the principal part of the heat, the smoke, and gases of combustion are conveyed away from the furnace by means of flues C, which necessarily carry off considerable heat. This heat is ordinarily lost, but I utilize it, and, at the same time, use it at points where it will be of more value than at present, by introducing it at various points around the chamber, and horizontally between the trays. In order to do this I carry the flues C over the bottom plate of the chamber from the center to opposite sides D, where they pass upward a short distance within inclosing-cases, as shown at E, and these cases, opening toward the interior of the chamber, will direct the heat of the flues into it up to the point where they turn, and are carried diagonally across their respective sides E to the corners, as shown at F. From the corner the flues are again carried diagonally across the two remaining fronts G, and in opposite directions. The flues are also inclosed in cases H on these two sides, and slots I are cut from the cases, so as to open into the chamber and admit another portion of the heated air between the layers of fruit at different heights. After crossing the faces G, the flues are again bent so as to cross the sides D diagonally until they reach the center, when they are carried into the vertical cases J which extend to the top of the drier. Openings m are made from the cases J, and thus another portion of heat is admitted to the chamber near the top, to finish the operation. From this point the flues may be carried up along the dome to a central discharge-opening or chimney.

Various equivalent methods of leading the flues and utilizing their heat may be employed and will readily suggest themselves, but I have found the present arrangement the simplest and most economical, and I am thus enabled to introduce heat at the right angles with the travel of the fruit, and at any point.

In order to elevate and support the trays of fruit after they are introduced, I have employed a combination of movable and stationary standards upon two opposite sides of the chamber, and these standards are provided with spring-catches, which can be forced inward to allow a tray to pass up, but will return to their place after it passes and prevent its going down.

Four stationary standards, K K, are set into the sides of the chamber, and extend vertically from top to bottom near the corners. The other four, L L, can be moved up and down in slots, and stand by the side of the standards K. Each set of standards is provided with spring-catches or supports which are formed as shown at n and n', so that a tray moving upward will depress them into the posts, but they will spring out after it passes.

The operation will then be as follows: A tray full of fruit being introduced through the lower door $t$ will rest upon four pins projecting from the movable standards or posts. These posts then being elevated, by means hereinafter described, the tray will be carried up until it passes the first set of catches $n$, upon the posts K. The posts L are then allowed to descend, and will leave the tray resting upon these catches. As the posts L descend, four similar catches, $n'$, upon them will be depressed and pass below the tray, so that when they are again elevated these last catches will lift the tray above the next set upon the stationary posts, and, in this manner, the trays are gradually moved from the bottom to the top of the chamber, where they are removed by the door $s$. Catches which would fall out by gravitation might be substituted for the springs, in some cases. The movable posts L may be elevated and depressed in many ways, as by cams, eccentrics, &c., but in the present case I have employed a central roller, O, with a crank at one end. Upon this roller cords or chains P are coiled, and their opposite ends, after passing over friction-rollers Q Q, are secured to the lower ends of the posts L. By turning the crank, the chains will be coiled upon the roller $o$, and the posts lifted, simultaneously. If necessary, spiral or other springs $r$ may be employed to cause the posts to descend, but in the full-sized machine the weight will be sufficient.

Having thus described my invention, what I claim as new, and desire to secure by Letters Patent, is—

1. In combination with a drying-chamber, the pipes or flues C passing diagonally along the slotted openings I, around and outside of the drier, and provided with coverings E H J, substantially as and for the purpose set forth.

2. In combination with a drier, the stationary posts K, provided with spring-catches $n$ $n$, and the vertically-moving posts L provided with the spring-catches $n'$ $n'$, and suitable mechanism for operating the posts L, substantially as and for the purpose set forth.

In witness whereof I hereunto set my hand and seal.

JOHN W. CASSIDY. [L. S.]

Witnesses:
 GEO. H. STRONG,
 JNO. L. BOONE.